UNITED STATES PATENT OFFICE 2,014,498

HALOGENATED DERIVATIVES OF THIAZOLE AND PROCESS OF PREPARING THE SAME

Treat B. Johnson, Bethany, Conn., assignor to Winthrop Chemical Company, Inc., New York, N. Y., a corporation of New York No Drawing. Application August 18, 1932,
Serial No. 629,396

12 Claims. (Cl. 260—44)

The present invention relates to a method of preparing thiazole compounds and to the products obtainable thereby.

In U. S. Patent No. 1,743,083 I have described a method for the preparation of thiazole compounds which in the 4-position of the thiazole ring:

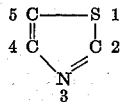

are substituted by an aromatic nucleus containing phenolic groups, and the products thus obtainable.

I have now found that a variety of thiazole compounds can be made accessible by processes which involve the synthesis of halogenated thiazole compounds as intermediate products being $$\text{Hlg—CH}_2\text{—}\overset{\overset{\text{CH—Hlg}}{\|}}{\text{C}}\text{—OH} +$$

substituted in the 4-position of the thiazole ring by a halogenated aliphatic radical which may be substituted by aryl radicals, and the subsequent replacement of a halogen atom by an inorganic or organic radical.

More particularly, the process which leads to the intermediate products being substituted in the 4-position of the thiazole ring as above indicated, and which process and products are the objects of the present application, involves a reaction between a thioamide compound containing the grouping

and a ketone having in its tautomeric enol form the general formula:

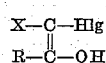

wherein R stands for a halogenated aliphatic radical which may be substituted by aryl radicals, and wherein X stands for hydrogen or alkyl or aryl or aralkyl, and wherein Hlg stands for either chlorine, bromine or iodine. Thus, if R stands for the unsubstituted or substituted group Hlg.CH₂—, the following general formula may result:

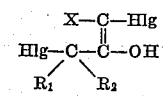

wherein X, R₁ and R₂ stand for hydrogen or an alkyl, aryl or arakyl radical, and wherein Hlg stands for chlorine, bromine or iodine. More specifically such compounds are, for instance, symmetrical dihalogen acetone, or 3.3-chloro-1-bromine-propanone(2), or 1.3-dibromo-propanone(2), or 1.3-dichloro-butanone(2), or bis-(α-brom-benzyl)-ketone.

Symmetrical dihalogen acetone has hitherto not been applied in the synthesis of thiazole compounds. Its reaction, in its tautomeric enol form with thioamide compounds may be formulated as follows:

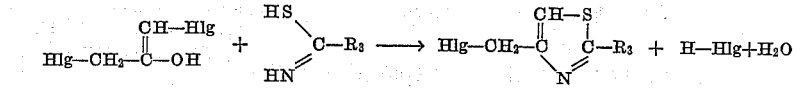

This type of reaction has now been found to be applicable with a great number of thioamides, and it offers a practical means of preparing intermediates of the above characterized type which are useful for the synthesis of thiazole combinations difficult to obtain by other methods.

It should be understood that any organic compound containing the thioamide grouping

may be used in the above synthesis. For instance, R₃ may represent a large variety of organic groups such as alkyl, hydroxalkyl, alkoxy, alkyl, aryl, aralkyl, alkyl substituted aryl, hydroxyaryl, alkoxy aryl; the aryl radical alone or in any of the combinations enumerated above may be substituted by various radicals such as hydroxyl, bromine, chlorine, iodine or O-alkyl. In particular I have employed in the above synthesis thioamide compounds in which R₃ represents the phenyl group which may contain one or more free or substituted hydroxy groups, which hydroxy groups may be in ortho-, meta- or para-position.

To illustrate, symmetrical dichloroacetone may be reacted with thiobenzamide to yield 4-chloromethyl-2-phenyl thiazole according to the following equation:

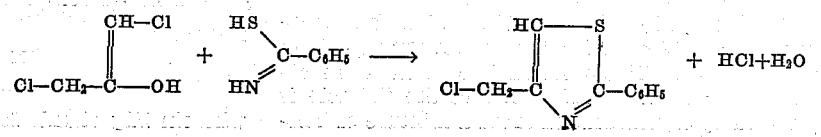

The reaction between ketones of the general formula:

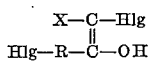

above discussed and the thioamide compound may be effected by heating the parent materials in an organic solvent. Thus, alcohol is used for the reaction between symmetrical dihalogen acetone, for instance, dichloro-acetone, and the thioamide compound. The resulting thiazole compounds substituted in the 4-position as above shown are generally obtained as crystals.

The following examples serve to illustrate my process and the halogenated thiazoles:

*Example 1.—2-phenyl-4-chloromethyl thiazole*

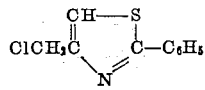

43 grams of dichloroacetone and 47 grams of thiobenzamide are dissolved in 150 cc. of alcohol and the solution warmed on a steambath for one hour. On cooling, and adding water, this thiazole is obtained as an oil which soon solidifies. Purification is accomplished by crystallization from petroleum ether. The thiazole crystallizes in the form of prisms which melt at 51° and boil at 155–156° C. under 4 mm. pressure. (Calc., N, 6.68; Found, 6.81 and 6.70.)

*Example 2.—2-(p-methoxyphenyl)-4-chloromethyl thiazole*

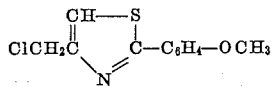

38 grams of dichloroacetone and 50 grams of p-methoxythiobenzamide were dissolved in 150 cc. of alcohol and the solution heated on a steambath for one hour. On adding water (about 500 cc.), the above thiazole was precipitated as an oil, which solidified on cooling. It was purified by dissolving in benzene and then reprecipitating the thiazole by diluting the solution with petroleum ether. It was obtained in the form of yellow prisms melting at 55–56° C. (Calc., N, 5.84; Found, N, 5.85, 5.77.)

*Example 3.—2-piperonyl-4-chloromethyl thiazole*

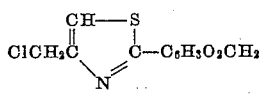

This thiazole is obtained by interaction of the thioamide of piperonylic acid with dichloroacetone on warming molecular proportions of these reagents in alcoholic solution.

The thiazole is purified by recrystallization from alcohol or acetone and crystallizes in needles melting at 106–107° C. (Calc., N, 5.52; Found, 5.53 and 5.37.)

*Example 4.—2-(3.4-dimethoxyphenyl)-4-chloromethyl thiazole*

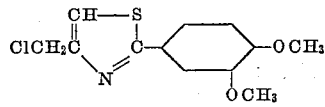

3.4-dimethoxythiobenzamide and dichloroacetone interact in molecular proportions to form this thiazole. The reaction is carried on in alcohol by heating at 100° C. and the thiazole is purified by crystallization from a mixture of benzene and ligroin. The yield is excellent, and the thiazole melts at 89–90° C. It crystallizes in needles. (Calc., N, 5.19; Found, 5.30, 5.22.)

*Example 5.—2-methyl-4-chloromethyl thiazole*

This thiazole is formed by taking molecular proportions of thioacetamide (20 grams) and dichloroacetone (34 grams and warming together in 150 cc. of absolute alcohol, at the boiling temperature of the solution. On heating, the alcohol assumes a wine-red color and the reaction is complete after 10 hours' digestion. The reaction product is the hydrochloride of the above thiazole, and it is very soluble in alcohol. The excess of alcohol is removed by evaporation when a thick syrup is obtained. This dissolves immediately in cold water, and the free thiazole is obtained by treatment with alkali. The thiazole is then extracted with ether, dried over $CaCl_2$ and finally distilled under diminished pressure. The boiling point is 65–67° C. at 3 mm. This is an odorless and colorless oil. (Calc. for $C_5H_6NSCl$, N, 9.49; Found, N, 9.40.)

I claim:

1. A process of preparing a halogenated thiazole compound which comprises causing a ketone having in its tautomeric enol form the general formula:

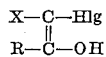

wherein Hlg stands for either chlorine, bromine or iodine, and wherein R stands for a halogenated aliphatic radical which may be substituted by a radical of the benzene series, and wherein X stands for hydrogen or an alkyl or a radical of the benzene or benzyl series, to react upon an organic compound of the general formula:

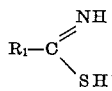

wherein $R_1$ stands for an organic radical selected from the group consisting of alkyl, lower hydroxy alkyl, lower alkoxy alkyl, phenyl, benzyl, lower alkyl-substituted phenyl, hydroxy phenyl, lower alkoxy phenyl, at an elevated temperature up to about 120° C.

2. A process of preparing a halogenated thiazole compound which comprises causing a ketone having in its tautomeric enol form the general formula:

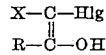

wherein Hlg stands for either chlorine, bromine or iodine, and wherein R stands for a halogenated aliphatic radical which may be substituted by a radical of the benzene series, and wherein X stands for hydrogen or an alkyl or a radical of the benzene or benzyl series, to react upon an organic compound of the general formula:

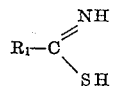

wherein $R_1$ represents an alkyl radical, at an elevated temperature up to about 120° C.

3. A process of preparing a halogenated thiazole compound which comprises causing a ketone having in its tautomeric enol form the general formula:

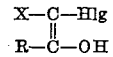

wherein Hlg stands for either chlorine, bromine or iodine, and wherein R stands for a halogenated aliphatic radical which may be substituted by a radical of the benzene series, and wherein X stands for hydrogen or an alkyl or a radical of the benzene or benzyl series, to react upon an organic compound of the general formula:

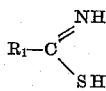

wherein R₁ stands for an organic radical selected from the group consisting of alkyl, lower hydroxy alkyl, lower alkoxy alkyl, phenyl, benzyl, lower alkyl-substituted phenyl, hydroxy phenyl, lower alkoxy phenyl, in an inert solvent, and at an elevated temperature up to about 120° C.

4. A process of preparing a halogenated thiazole compound which comprises causing a ketone having in its tautomeric enol form the general formula:

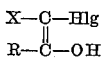

wherein Hlg stands for either chlorine, bromine or iodine, and wherein R stands for a halogenated aliphatic radical which may be substituted by a radical of the benzene series, and wherein X stands for hydrogen or an alkyl or a radical of the benzene or benzyl series, to react upon an organic compound of the general formula:

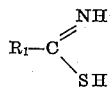

wherein R₁ represents an alkyl radical, in an inert solvent and at an elevated temperature up to about 120° C.

5. A process of preparing 2-phenyl-4-chloromethyl-thiazole of the formula:

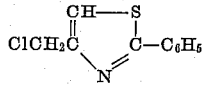

which comprises dissolving molecular quantities of dichloroacetone and of thiobenzamide in alcohol, warming the solution on the steam-bath until condensation is finished, cooling the solution and adding water, whereby the thiazole is precipitated as an oil which soon solidifies.

6. A process of preparing 2-(3.4-dimethoxyphenyl)-4-chloromethyl thiazole of the formula:

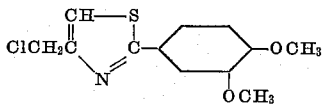

which comprises heating an alcoholic solution of 3.4-dimethoxythiobenzamide and dichloroacetone in molecular proportions at 100° C., separating the thiazole compound and purifying it by crystallization from a mixture of benzene and ligroin.

7. A process of preparing 2-methyl-4-chloromethyl-thiazole which comprises heating in alcohol molecular proportions of thioacetamide and dichloro-acetone at the boiling temperature of the solution until condensation is finished, removing the excess of alcohol by evaporation, whereby a thick syrup is obtained, dissolving said syrup in cold water, treating this solution with alkali and extracting the thiazole compound therefrom with ether.

8. The halogenated thiazole compounds of the general formula:

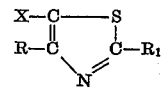

wherein R stands for a halogenated aliphatic radical which may be substituted by a radical of the benzene series and wherein X stands for hydrogen or alkyl, or a radical of the benzene or benzyl series, and wherein R₁ represents an organic radical selected from the group consisting of alkyl, lower hydroxy alkyl, lower alkoxy alkyl, phenyl, benzyl, lower alkyl-substituted phenyl, hydroxy phenyl, lower alkoxy phenyl, said compounds being generally well crystallized substances.

9. The halogenated thiazole compounds of the general formula:

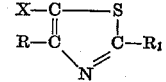

wherein R stands for a halogenated aliphatic radical which may be substituted by a radical of the benzene series and wherein X stands for hydrogen or alkyl, or a radical of the benzene or benzyl series, and wherein R₁ represents an alkyl radical, said compounds being generally well crystallized substances.

10. 2-phenyl-4-chloromethyl thiazole of the formula:

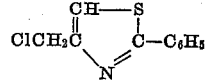

which crystallizes in the form of prisms showing a melting point of 51° C. and a boiling point of 155–156° C. under 4 mm. pressure.

11. 2-(3.4-dimethoxyphenyl)-4-chloromethyl thiazole of the formula:

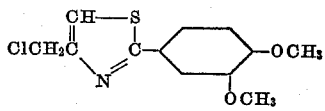

said thiazole compound crystallizing in needles which melt at 89–90° C.

12. 2-methyl-4-chloromethyl thiazole of the formula:

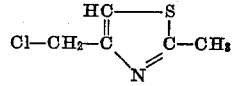

said compound being an odorless and colorless oil boiling at 65–67° C. at a pressure of 3 mm.

TREAT B. JOHNSON.